(12) United States Patent
Gajiwala et al.

(10) Patent No.: US 9,850,353 B2
(45) Date of Patent: Dec. 26, 2017

(54) ARTICLES AND ARMOR MATERIALS INCORPORATING FIBER-FREE COMPOSITIONS AND METHODS OF FORMING SAME

(71) Applicant: Orbital ATK, Inc., Dulles, VA (US)

(72) Inventors: Himansu M. Gajiwala, Layton, UT (US); John W. Ellertson, Brigham City, UT (US)

(73) Assignee: Orbital ATK, Inc., Plymouth, MN (US)

(*) Notice: Subject to any disclaimer, the term of this patent is extended or adjusted under 35 U.S.C. 154(b) by 278 days.

(21) Appl. No.: 14/599,395

(22) Filed: Jan. 16, 2015

(65) Prior Publication Data
US 2015/0361229 A1 Dec. 17, 2015

Related U.S. Application Data

(63) Continuation of application No. 12/879,827, filed on Sep. 10, 2010, now abandoned.

(51) Int. Cl.
| | |
|---|---|
| *C08J 5/00* | (2006.01) |
| *B82Y 30/00* | (2011.01) |
| *C08J 3/24* | (2006.01) |
| *C08K 3/34* | (2006.01) |
| *C08K 5/00* | (2006.01) |
| *B29C 35/02* | (2006.01) |
| *B29C 39/00* | (2006.01) |
| *F41H 5/04* | (2006.01) |
| *B29K 9/00* | (2006.01) |
| *B29K 105/06* | (2006.01) |
| *B29K 309/00* | (2006.01) |
| *B29L 31/00* | (2006.01) |

(52) U.S. Cl.
CPC ............... *C08J 5/00* (2013.01); *B29C 35/02* (2013.01); *B29C 39/003* (2013.01); *B82Y 30/00* (2013.01); *C08J 3/24* (2013.01); *C08J 5/005* (2013.01); *C08K 3/346* (2013.01); *C08K 5/0025* (2013.01); *F41H 5/04* (2013.01); *B29K 2009/00* (2013.01); *B29K 2105/06* (2013.01); *B29K 2309/00* (2013.01); *B29L 2031/768* (2013.01); *C08J 2309/02* (2013.01); *C08J 2473/00* (2013.01); *C08K 2201/011* (2013.01)

(58) Field of Classification Search
CPC . C08K 3/34; C08J 5/00; B29C 39/003; B29C 35/02
See application file for complete search history.

(56) References Cited

U.S. PATENT DOCUMENTS

| | | |
|---|---|---|
| 2,870,108 A | 1/1959 | Nickerson |
| 2,943,073 A | 6/1960 | Brantley |
| 2,964,457 A | 12/1960 | Kraus |
| 3,307,530 A | 3/1967 | Stack |
| 3,347,047 A | 10/1967 | Hartz et al. |
| 3,373,397 A | 3/1968 | Renshaw, Jr. |
| 3,421,970 A | 1/1969 | Daly et al. |
| 3,562,304 A | 2/1971 | Tucker |
| 3,637,576 A | 1/1972 | Sutherland |
| 3,686,868 A | 8/1972 | Chase et al. |
| 3,723,481 A | 3/1973 | Bobear |
| 3,908,061 A | 9/1975 | Byrne et al. |
| 3,928,282 A | 12/1975 | Lohr, Jr. et al. |
| 3,973,397 A | 8/1976 | Chase et al. |
| 4,066,590 A | 1/1978 | Eldred et al. |
| 4,072,796 A | 2/1978 | Reinhardt et al. |
| 4,297,145 A | 10/1981 | Wolff et al. |
| 4,369,297 A | 1/1983 | Bilow |
| 4,373,048 A | 2/1983 | Schubert et al. |
| 4,433,020 A | 2/1984 | Narukawa et al. |
| 4,492,779 A | 1/1985 | Junior et al. |
| 4,504,532 A | 3/1985 | Herring |
| 4,507,165 A | 3/1985 | Herring |
| 4,514,541 A | 4/1985 | Frances |

(Continued)

FOREIGN PATENT DOCUMENTS

| | | |
|---|---|---|
| EP | 0116453 A2 | 8/1984 |
| EP | 0172957 A1 | 3/1986 |

(Continued)

OTHER PUBLICATIONS

"Basalt fiber," Wikipedia, <<http://en.wikipedia.org/wiki/Basalt_fiber>> Nov. 25, 2005, 1 page.
"Buss Kneader MKS Modular Series" Flexible systems featuring high process reliability for cost-effective compounding solutions, brochure, Buss (America), Inc., Bloomingdale, Illinois.
Buss Kneader Operating Principle, http:/www.busscompounding.com/Seiten/English/Buss%20Kneader/kneader1.htm, Dec. 3, 1999.
Calender, Merriam-Webster, http://www.merriamwebster.com/dictionary/calender (last visited Jan. 9, 2012).
Chang, Karl K., Aramid Fibers, ASM International Handbook, vol. 21, p. 41.
Cloisite Nanoclays. "Cloisite and Nanofil Additives., 2006" Retrieved online http://www.nanoclay.com/benefits2.asps>.
Darmstadt, H., 1997, Elsevier Science Ltd., Effects of Surface Treatment on the Bulk Chemistry and Structure of Vapor Grown Carbon Fibers, p. 1581, 5 pages.

(Continued)

*Primary Examiner* — Hannah Pak
(74) *Attorney, Agent, or Firm* — TraskBritt

(57) ABSTRACT

Materials including support layers and fiber-free compositions are disclosed, as well as related articles and methods for making the materials. The fiber-free compositions are formed from a precursor composition that includes a nitrile butadiene rubber, a nanoclay and a cure package including a sulfur-based curing agent. The fiber-free compositions may have a substantially reduced weight and compressive modulus in comparison to conventional rubber. Thus, the fiber-free compositions may provide improved ballistic properties in addition to reduced density and thickness. Precursor compositions for forming the insulative composition may have good flow characteristics. The fiber-free compositions may be used in a variety of applications, such as personnel body armor, ground vehicle armor and aircraft armor systems.

22 Claims, 1 Drawing Sheet

(56) References Cited

U.S. PATENT DOCUMENTS

| | | | |
|---|---|---|---|
| 4,524,169 A | 6/1985 | Wolff et al. |
| 4,550,130 A | 10/1985 | Kishida et al. |
| 4,600,732 A | 7/1986 | Junior et al. |
| 4,640,861 A | 2/1987 | Binnersley et al. |
| 4,649,701 A | 3/1987 | Wendel |
| 4,663,065 A | 5/1987 | Herring |
| 4,666,763 A | 5/1987 | King et al. |
| 4,711,086 A | 12/1987 | Offe et al. |
| 4,785,047 A | 11/1988 | Jensen |
| 4,878,431 A | 11/1989 | Herring |
| 4,953,476 A | 9/1990 | Sayles |
| 4,956,397 A | 9/1990 | Rogowski et al. |
| 4,980,233 A | 12/1990 | McCullough, Jr. et al. |
| 4,997,716 A | 3/1991 | McCullough, Jr. et al. |
| 4,999,238 A | 3/1991 | Gawin |
| 5,007,343 A | 4/1991 | Marks |
| 5,019,450 A | 5/1991 | Cogswell et al. |
| 5,024,818 A | 6/1991 | Tibbetts et al. |
| 5,024,860 A | 6/1991 | Chang et al. |
| 5,038,561 A | 8/1991 | Chase |
| 5,039,572 A | 8/1991 | Bobsein et al. |
| 5,122,420 A | 6/1992 | Baron et al. |
| 5,212,944 A | 5/1993 | Martin et al. |
| 5,213,889 A | 5/1993 | Cogswell et al. |
| 5,216,057 A | 6/1993 | Pratt et al. |
| 5,225,457 A | 7/1993 | Borowczak et al. |
| 5,276,093 A | 1/1994 | Kitagawa et al. |
| 5,340,633 A | 8/1994 | van der Loo et al. |
| 5,344,689 A | 9/1994 | Ide et al. |
| 5,352,312 A | 10/1994 | Guillot |
| 5,352,507 A | 10/1994 | Bresson et al. |
| 5,364,905 A | 11/1994 | Bauer et al. |
| 5,374,415 A | 12/1994 | Alig et al. |
| 5,391,627 A | 2/1995 | Araki et al. |
| 5,399,599 A | 3/1995 | Guillot et al. |
| 5,409,775 A | 4/1995 | Harada et al. |
| 5,437,920 A | 8/1995 | Bauer et al. |
| 5,498,649 A | 3/1996 | Guillot et al. |
| 5,547,525 A | 8/1996 | Bennett et al. |
| 5,565,535 A | 10/1996 | Costin et al. |
| 5,569,716 A | 10/1996 | Okamoto et al. |
| 5,594,060 A | 1/1997 | Alig et al. |
| 5,621,045 A | 4/1997 | Patel et al. |
| 5,629,371 A | 5/1997 | Kitagawa et al. |
| 5,661,198 A | 8/1997 | Inatani et al. |
| 5,721,301 A | 2/1998 | Takigawa |
| 5,762,746 A | 6/1998 | Hartwell et al. |
| 5,767,221 A | 6/1998 | Poulter et al. |
| 5,780,538 A | 7/1998 | Cohen et al. |
| 5,821,284 A | 10/1998 | Graham et al. |
| 5,830,384 A | 11/1998 | Stephens et al. |
| 5,840,227 A | 11/1998 | Bourdoncle et al. |
| 5,891,561 A | 4/1999 | Kinoshita et al. |
| 5,989,459 A | 11/1999 | Nguyen et al. |
| 6,287,639 B1 | 9/2001 | Schmidt et al. |
| 6,489,385 B1 | 12/2002 | Fujii et al. |
| 6,554,936 B1 | 4/2003 | Metcalf et al. |
| 6,606,852 B1 | 8/2003 | Harvey et al. |
| 6,691,505 B2 | 2/2004 | Harvey et al. |
| 6,812,276 B2 | 11/2004 | Yeager |
| 7,013,998 B2 | 3/2006 | Ray et al. |
| 7,078,453 B1* | 7/2006 | Feeney ............ B82Y 30/00 524/444 |
| 7,250,477 B2 | 7/2007 | Guo et al. |
| 7,267,882 B2 | 9/2007 | Breslin et al. |
| 7,358,314 B2 | 4/2008 | Gajiwala et al. |
| 7,767,746 B2 | 8/2010 | Gajiwala |
| 7,968,620 B2 | 6/2011 | Gajiwala |
| 8,026,307 B2 | 9/2011 | Miller |
| 8,043,696 B2 | 10/2011 | Chen et al. |
| 8,065,947 B2 | 11/2011 | Park et al. |
| 8,505,432 B2 | 8/2013 | Kidd et al. |
| 2002/0018847 A1 | 2/2002 | Guillot |
| 2002/0142147 A1 | 10/2002 | Sogabe et al. |
| 2002/0189233 A1 | 12/2002 | Harvey et al. |
| 2004/0095658 A1 | 5/2004 | Buretea et al. |
| 2004/0122153 A1 | 6/2004 | Guo et al. |
| 2004/0132894 A1 | 7/2004 | Dias et al. |
| 2004/0157979 A1 | 8/2004 | Harvey et al. |
| 2004/0237713 A1 | 12/2004 | Breslin et al. |
| 2004/0241479 A1 | 12/2004 | Domine et al. |
| 2005/0032937 A1 | 2/2005 | Tsou et al. |
| 2005/0059754 A1 | 3/2005 | Lunt et al. |
| 2005/0065264 A1 | 3/2005 | Pazur |
| 2005/0101737 A1 | 5/2005 | Pazur et al. |
| 2005/0142349 A1 | 6/2005 | Irwin et al. |
| 2005/0202258 A1 | 9/2005 | Swales et al. |
| 2005/0211930 A1 | 9/2005 | DeMeo et al. |
| 2005/0266757 A1 | 12/2005 | Roekens et al. |
| 2006/0074168 A1 | 4/2006 | Nelson et al. |
| 2007/0049699 A1 | 3/2007 | Nasreddine et al. |
| 2007/0191526 A1* | 8/2007 | Jordan ............ A63B 37/0003 524/445 |
| 2007/0224401 A1* | 9/2007 | Telander ............ B32B 5/26 428/212 |
| 2007/0254988 A1 | 11/2007 | Gajiwala et al. |
| 2007/0261385 A1 | 11/2007 | Gajiwala |
| 2008/0319119 A1* | 12/2008 | Waddell ............ B60C 1/0008 524/445 |
| 2009/0115108 A1 | 5/2009 | Rodgers et al. |
| 2010/0036025 A1 | 2/2010 | Rodgers et al. |
| 2010/0203304 A1 | 8/2010 | Carbajal |
| 2010/0205929 A1 | 8/2010 | Gajiwala |
| 2011/0192274 A1 | 8/2011 | Fingerhut |
| 2011/0256341 A1 | 10/2011 | Geva et al. |
| 2011/0296979 A1 | 12/2011 | Howland |
| 2012/0065294 A1 | 3/2012 | Gajiwala et al. |
| 2012/0088072 A1 | 4/2012 | Pawloski et al. |
| 2012/0160086 A1 | 6/2012 | Carbajal |
| 2012/0164370 A1 | 6/2012 | Carbaja |

FOREIGN PATENT DOCUMENTS

| | | |
|---|---|---|
| EP | 0446573 A2 | 9/1991 |
| EP | 0446573 A3 | 9/1991 |
| EP | 1475405 A1 | 11/2004 |
| EP | 1512718 A1 | 3/2005 |
| FR | 2554114 A1 | 5/1985 |
| GB | 1301296 | 12/1972 |
| JP | 8-127674 | 5/1996 |
| WO | 9119754 A1 | 12/1991 |
| WO | 0104198 A1 | 1/2001 |
| WO | 0120966 A2 | 3/2001 |
| WO | 0146279 A1 | 6/2001 |
| WO | 02079307 A2 | 10/2002 |
| WO | 2006066395 A1 | 6/2006 |
| WO | 2007053640 A2 | 5/2007 |

OTHER PUBLICATIONS

Das et al., Rubber Curing Chemistry Governing the Orientation of Layered Silicate, eXPRESS Polymer Letters (2007), vol. 1, No. 11, pp. 717-723.

DuPont Dow Elastomers, "Nordel IP Product Specification Information," 1997, pp. 2-3.

DuPont Dow Elastomers, Introducing Nordel IP, Setting a New Standard in Predictability, "Delivering a New Standard of Performance," (1997), pp. 1-6.

DuPont Dow Elastomers, Nordel IP NDR 4640, "Nordel IP Grade Comparison," (1997), pp. 1-7.

DuPont Dow Elastomers, Nordel IP NDR-4520, "Nordel IP Grade Comparison," (1997), pp. 1-5.

Hill, "Usage of Vapor Grown Carbon Fiber Composit with Phenolic Matrix in the Space Shuttle Usable Solid Rocket Motor Nozzle," Online!: May 13, 1999, Mississippi State University, Retrieved from the Internet: < URL: http://www.me.msstate.edu/STUDENT/ThesisHill.htm> Retrieved on Mar. 14, 2003.

Ibarra et al., "The Effect of Oxidized Carbon Fibre Content on the Properties of Thermal Plastic Elastomer Composites," Kautschuk and Gummi—Kunststoffe, Dr. Alfred Huthig Verlag Gmbh; Heidelberg, DE; vol. 50, No. 6, Jun. 1, 1997, pp. 478-480, 482, 484.

(56) References Cited

OTHER PUBLICATIONS

Kim et al., Structure and Properties of the Organoclay Filled NR/BR Nanocomposites, Macromolecular Research (2006), vol. 14, No. 2, pp. 187-193.
Kim et al., Formation of Polymer Nanocomposites with Various Organoclays, Journal of Applied Polymer Science (2005), vol. 96, pp. 1888-1896.
Libera, Joseph, et al., 2001, Pergamon, Hydrothermal synthesis of graphite tubes using Ni catalyst, pp. 1308 & 1317, 12 pages.
Patton et al., "Vapor Grown Carbon Fiber Composites with Epoxy and Poly(Phenylene Sulfide) Matrices," Composites Part A: Applied Science and Manufacturing; Elsevier Science Publishers B.V.; Amsterdam, NL; vol. 30, No. 9; Sep. 1999; pp. 1081-1091.
Pennwalt, "Dialkyl Peroxides", Product Bulletin, Buffalo, New York, 2 pages.
Product Description, Grades of Nordel IP Based on Insite Catalysts and Process Technology (1997), p. 3.
Product literature on Saret 633 and Saret 634 Metallic Coagents, 2 pages.
Product literature on TULCO-Treated Silica Products (Jun. 1999), p. 2.
Product literature, "Treated Fumed Silicas Product Guide," for Cabot Products CAB-O-SIL Treated Fumed Silica (Jun. 1999).
Rajasekar et al., Development of Nitrile Butadiene Rubber-Nanoclay Composites with Epoxidized Natural Rubber as Compatibilizer, Marterials and Design (2009), vol. 30, pp. 3839-3845.
Sutton, G.P., "Rocket Propulsion Element," 1992, Wiley & Sons, New York, US, pp. 106-109.
Tarasen et al., Pyrograf III VGSF Nanofibers for Engineered Composites, 16 pages.

* cited by examiner

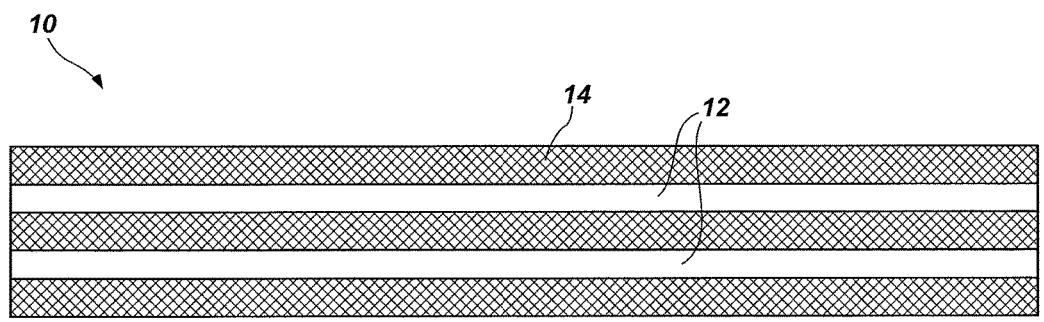

ARTICLES AND ARMOR MATERIALS INCORPORATING FIBER-FREE COMPOSITIONS AND METHODS OF FORMING SAME

CROSS-REFERENCE TO RELATED APPLICATIONS

This application is a continuation of U.S. patent application Ser. No. 12/879,827, filed Sep. 10, 2010, now abandoned, the disclosure of which is hereby incorporated herein in its entirety by this reference.

The subject matter of the present application is related to the subject matter of U.S. Pat. No. 7,767,746, issued Aug. 3, 2010, and titled BASALT FIBER AND NANOCLAY COMPOSITIONS, ARTICLES INCORPORATING THE SAME, AND METHODS OF INSULATING A ROCKET MOTOR WITH THE SAME; U.S. Pat. No. 7,968,620, issued Jun. 28, 2011, and titled ROCKET MOTORS INCORPORATING BASALT FIBER AND NANOCLAY COMPOSITIONS AND METHODS OF INSULATING A ROCKET MOTOR WITH THE SAME; and U.S. Pat. No. 8,505,432, issued Aug. 13, 2013, and titled MULTILAYER BACKING MATERIALS FOR COMPOSITE ARMOR; each of which is assigned to the Assignee of the present application. The disclosures of each of these patents are hereby incorporated herein in their entirety by this reference.

TECHNICAL FIELD

The present invention relates to an insulative composition, articles incorporating the insulative composition and a method of forming the same. More specifically, embodiments of the present invention relate to an insulative composition including nitrile butadiene rubber and a nanoclay and having physical, mechanical and rheological properties suitable for use in military applications, such as in personnel armor, ground vehicle armor and aircraft armor systems.

BACKGROUND

Particulate fillers, such as silica, have conventionally been used as reinforcing materials for polymer materials, such as nitrile butadiene rubber (NBR), to improve physical properties such as compressive modulus, tensile strength, abrasion, tear properties and dynamic properties. For example, a silica-filled nitrile butadiene rubber (SFNBR) has been used for ballistic applications.

Because silica has strong filler-filler interactions and adsorbs polar materials, silica-filled rubber compounds exhibit poor dispersion of the filler and poor cure characteristics. Furthermore, conventional SFNBR often may include fibers and are, thus, anisotropic materials having different properties when measured along different directions therein. Currently available SFNBR compositions also have undesirably high specific gravities and compressive modulus. The conventional SFNBR compositions include high contents of NBR, which result in high viscosities (i.e., Mooney viscosities of greater than about 50) and flow issues. Silica has also been shown to significantly retard the cure rate of the SFNBR, which may be attributed to the adsorption of curatives on the silica surface. Furthermore, conventional SFNBR compositions include components that are either difficult to obtain or are not available in the United States.

Recently, there has been considerable interest in forming polymer materials reinforced with nanosized particles, often referred to as "nanocomposites." Such nanocomposites conventionally include nanoclay particles dispersed in a polymer material. Smectite clays, such as montmorillonite clays, are most commonly used as nanoclays in nanocomposites due to their high cation exchange capacities, large surface area, good surface reactivity and surface adsorptive properties. Depending on an amount of dispersion of the nanoclay particles within the polymer material, the nanocomposite may have either an intercalated structure or an exfoliated structure. In an intercalated nanocomposite, layers of the polymer material are disposed between sheets of the nanoclay particles. In an exfoliated nanocomposite, the polymer material is completely dispersed within the sheets of nanoclay particles.

Development of nanocomposites is difficult, however, because thermodynamic and kinetic barriers inhibit dispersion of the nanoclay particles in the polymer material. For example, the hydrophilic nature of nanoclay particles prevents dispersion and results in formation of aggregates in the polymer material. Furthermore, mixing the nanoclay particles with the polymer material may result in an uncured composition having an undesirably high viscosity and inadequate flow properties for use in certain applications.

Insulative compositions having improved processability and improved properties, as well as methods for making such compositions are desired.

BRIEF SUMMARY

The present invention, in several embodiments, relates to an insulative composition that, before curing, includes at least one nitrile butadiene rubber, a nanoclay and a sulfur-based cure package. For example, the nitrile butadiene rubber may be present in the insulative composition in an amount of between about 60% by weight and about 70% by weight and, more particularly, about 65.25% by weight of a total weight of the insulative composition. The nanoclay may include a montmorillonite clay, such as CLOISITE® nanoclay. The cure package may include a sulfur-based curing agent. In addition to the sulfur-based curing agent, the cure package may include at least one of tetramethyl thiuram disulfide and benzothiazyl disulfide. As a non-limiting example, the insulative composition may include about 1.31% by weight of the sulfur-based curing agent, about 0.33% by weight of the tetramethyl thiuram disulfide, and about 0.65% by weight of the benzothiazyl disulfide. The insulative composition may further include at least one of an amine antioxidant, a phenolic resin, stearic acid, dioctyl phthalate, and zinc oxide.

The present invention also relates to a precursor of an insulative composition that includes a polymer comprising at least one nitrile butadiene rubber, a nanoclay and a cure package including a sulfur-based curing agent, wherein the precursor composition has a flowable consistency. For example, the precursor composition may have a Mooney viscosity of between about 5 and about 30 and, more particularly about 24.4.

The present invention also relates to an article of manufacture that includes a sheet of fibrous material and insulative composition disposed on the sheet of the fibrous material and including at least one nitrile butadiene rubber, a nanoclay and a cure package comprising a sulfur-based curing agent and at least one of tetramethyl thiuram disulfide and benzothiazyl disulfide.

The present invention also relates to a method of forming a precursor of an insulative composition that includes exfoliating a nanoclay with a polymer comprising at least one nitrile butadiene rubber to form a master batch comprising a substantially homogeneous mixture of the polymer and the nanoclay, mixing a portion of the master batch with a cure package comprising a sulfur-based cure agent to form a mixture and combining a remaining portion of the master batch with the mixture to form a precursor having a flowable consistency. The polymer may be mixed with the nanoclay for between about 5 minutes and about 25 minutes to exfoliate the nanoclay with the polymer forming the master batch. An amine antioxidant and a phenolic resin may additionally be incorporated into the master batch. For example, about one-half of a total volume of the master batch may be mixed with the cure package to form the mixture.

BRIEF DESCRIPTION OF THE DRAWING

While the specification concludes with claims particularly pointing out and distinctly claiming that which is regarded as the present invention, advantages of this invention may be more readily ascertained from the following detailed description when read in conjunction with the accompanying drawing in which:

FIG. 1 illustrates an embodiment of an article including an insulative composition of the present disclosure.

DETAILED DESCRIPTION

Insulative compositions including a nitrile butadiene rubber (NBR) and a nanoclay, such as CLOISITE® nanoclay are disclosed, and may be formulated to have a low specific gravity and compressive modulus. As used herein, the term "nanoclay" means and includes a clay material in the form of fine particles having an average primary dimension of less than about 100 nm. The insulative compositions may be used as insulation for an armor material, or in association with another article or assembly that would benefit from protection from impact. The insulative composition may have improved rheological, physical and mechanical properties in comparison to a conventional SFNBR composition. For instance, a specific gravity and compressive modulus of the insulative composition of the present invention may be substantially lower than the specific gravity and the compressive modulus of conventional SFNBR compositions. The reduced compressive modulus of the insulative composition provides improved strength and shock absorption. The reduced specific gravity of the insulative composition provides reduced weight. Accordingly, the insulative composition may provide similar or improved ballistic properties at densities and/or thicknesses of less than or equal to those of the conventional SFNBR compositions. The insulative composition of the present invention is fiber-free and, thus, is an isotropic material having substantially uniform properties throughout. Furthermore, the compounds used to form the insulative composition are readily available.

A precursor composition of the insulative compositions is also disclosed. The precursor composition may exhibit a sufficiently low viscosity such that the precursor composition has a flowable consistency. As used herein, the terms "flowable" and "free-flowing" mean and include a sufficiently low viscosity that enables material to change shape or direction substantially uniformly in response to an external force (e.g., gravity or a weight of the material itself) such that the material readily flows out of a container at room temperature. For example, a Mooney viscosity (Vm) of the precursor composition may be less than or equal to about 30 Mooney units at a temperature of between about 20° C. to about 100° C. and, more particularly, may be between about 15 Mooney units and about 25 Mooney units at a temperature of between about 20° C. and about 100° C.

Also disclosed is a method for forming a precursor composition that provides increased exfoliation of the nanoclay within the NBR in the cured insulative composition. As used herein, "exfoliation" means and includes a delamination process wherein individual sheets or platelets of the nanoclay particles are spatially separated by a polymer material (i.e., NBR), causing expansion of the layered nanoclay structure. The atomic configuration of a nanoclay includes alternating sheets of atomic units. For example, the nanoclay may be an alumina silica nanoclay that includes silica ($SiO_4$) tetrahedral and alumina ($AlO_6$) octahedral units that are organized into a plurality of sheets or platelets by oxygen sharing between units. During exfoliation of the NBR by the nanoclay, the NBR may enter into sheets of nanoclay particles, resulting in interlayer spacing of the NBR and the nanoclay particles. As the sheets of the nanoclay continue to separate from one another, spacing between each of the sheets of the nanoclay is increased such that the sheets of the nanoclay become substantially homogeneously dispersed in the NBR.

The method may include mixing the NBR and the nanoclay for an amount of time sufficient to substantially homogeneously distribute the nanoclay in the NBR. In some embodiments, the NBR and the nanoclay may be mixed with an antioxidant and a processing aid for about 12 minutes to disperse the nanoclay in the NBR forming a substantially homogeneous mixture. Additives may optionally be mixed with the substantially homogeneous mixture of the nanoclay and NBR to form a master batch. A cure package may be added to and mixed with a portion of the master batch, such as about one-half (½) of a total volume of the master batch. The cure package may include, for example, a sulfur-based curing agent and at least one cure accelerator. The remaining portion of the master batch may then be added to form a precursor composition having a free-flowing consistency. Increased distribution of the nanoclay in the NBR matrix may result in improved physical, mechanical and rheological properties in the insulative composition.

The nitrile butadiene rubber used in the precursor of the insulative composition may be a nitrile butadiene rubber having an acrylonitrile content of between about 26 wt % and about 35 wt %, such as from between about 30 wt % and about 35 wt %. As used herein, the phrase "acrylonitrile content" means and includes a percentage of bound acrylonitrile present in the NBR. Combinations of NBRs, each having an acrylonitrile content within the above-mentioned range, may also be used. The NBR may be unhydrogenated or hydrogenated. The precursor of the insulative composition may include between about 50 wt % and about 80 wt % of a total weight of the precursor of the insulative composition and, more particularly, between about 60 wt % and about 70 wt % of the total weight of the precursor of the insulative composition of the NBR. Examples of NBRs that may be used in the insulative composition include, but are not limited to, those sold under the NIPOL® tradename, such as NIPOL® 1042, NIPOL® 1052, NIPOL® 1052-30, NIPOL® 1312, or combinations thereof. The NIPOL® nitrile butadiene rubbers are copolymers of acrylonitrile and butadiene and are commercially available from Zeon Chemicals (Louisville, Ky.). NIPOL® 1042 has an acrylonitrile content of between about 32 wt % and about 34 wt %, a Mooney viscosity at 100° C. of between about 75 and about 90, and a specific gravity of 0.98. NIPOL® 1052 has an acrylonitrile content of between about 32 wt % and about 34 wt %, a Mooney viscosity at 100° C. of between about 45 and about 60, and a specific gravity of about 0.98. NIPOL® 1052-30 is a lower Mooney viscosity version of NIPOL® 1052 and has an acrylonitrile content of between about 32 wt % to about 34 wt %, a Mooney viscosity at 100° C. of between about 25 and about 40, and a specific gravity of about 0.98. NIPOL® 1312 is a liquid NBR and has an acrylonitrile content of between about 27 wt % and about 30 wt %, a Brookfield viscosity at 50° C. of between about 20,000 centipoise ("cps") and about 30,000 cps, and a specific gravity of about 0.96. NBRs that may be used in the insulative composition are available under other tradenames including, but not limited to, the KRYNAC® polymers and PERBUNAN® polymers, which are commercially available from Bayer AG (Leverkusen, Germany), and PARACRIL® polymers, which are commercially available from Uniroyal Chemical Company (Middlebury, Conn.).

The nanoclay used in the insulative composition may include, for example, clay from the smectite family. The term "smectite," as used herein, means and includes a group of particulate clay materials, such as montmorillonite, beidellite, nontronite and saponite. Smectites have a unique morphology, including at least one dimension in the nanometer range. The precursor of the insulative composition may include between about 6 wt % and about 15 wt % of the total weight of the precursor of the insulative composition of the nanoclay and, more particularly, between about 8 wt % and about 12 wt % of the total weight of the precursor of the insulative composition of the nanoclay. The nanoclay may include, for example, a montmorillonite clay, such as a CLOISITE® nanoclay, which is commercially available from Southern Clay Products, Inc. (Gonzales, Tex.). CLOISITE® nanoclays include nanoparticles having anisotropic, plate-like, high aspect-ratio morphologies. CLOISITE® nanoclays include organically modified nanometer scale, layered magnesium aluminum silicate platelets. The magnesium aluminum silicate platelets may have a thickness of about 1 nm and a width of between about 70 nm and about 150 nm. The magnesium aluminum silica platelets are surface modified to enable complete dispersion into and provide miscibility with the NBR. For example, CLOISITE® 10A nanoclay includes magnesium aluminum silicate platelets modified with a quaternary ammonium salt. Table 1 shows physical properties and mechanical properties of CLOISITE® 10A nanoclay.

TABLE 1

| Properties of CLOISITE ® 10A nanoclay | |
|---|---|
| Specific Gravity | 1.90 g/cc |
| Bulk Density | 0.1636 g/cc (loose) |
| | 0.2647 g/cc (packed) |
| Loss On Ignition | 39% |
| Particle Size | 10% less than: 2 μm |
| | 50% less than: 6 μm |
| | 90% less than: 13 μm |
| Hardness, Shore D | 83 |
| Tensile Strength, Ultimate | 101 MPa |
| Elongation at Break | 8% |
| Modulus of Elasticity | 4.657 GPa |
| Flexural Modulus | 3.78 GPa |
| Izod Impact, Notched | 0.27 J/cm |

The cure package may contain a sulfur-based curing agent and a cure accelerator. Examples of sulfur-based curing agents include, but are not limited to, laccofine sulfur, which is commercially available from S.F. Sulfur Corporation (Freeport, Tex.), CRYSTEX® OT-20 (an oil-treated polymeric sulfur), which is available from Flexsys America LP (Akron, Ohio), AKROSPERSE® IS-70 (a 70% sulfur dispersion), which is available from Akrochem Chemical Corp. (Akron, Ohio), other forms of elemental sulfur, and combinations thereof. The sulfur-based curing agent may be included in the precursor of the insulative composition in an amount of between about 0.5 wt % and about 3 wt % of the total weight of the precursor of the insulative composition and, more particularly, between about 1 wt % and about 2 wt % of the total weight of the precursor of the insulative composition.

Examples of cure accelerators include sulfides, such as tetramethyl thiuram disulfide (TMTD), benzothiazol disulfide, such as NAUGEX® MBTS from Chemtura USA Corporation (Middlebury, Conn.) and ALTAX® from R.T. Vanderbilt Company, Inc., dipentamethylenethiuram hexasulfide, such as SULFADS® from R.T. Vanderbilt Company, Inc., butyl zimates, such as zinc di-n-butyldithiol carbamate and phosphates, such as RHENOCURE®, which is commercially available from Rhein-Chemie Reinau GMBH (Mannheim, Germany) and ACCELERATOR VS from Akrochem Chemical Corp., and combinations thereof. The cure accelerator may be included in the precursor of the insulative composition in an amount of between about 0.1 wt % and about 1 wt % of the total weight of the precursor of the insulative composition and, more particularly, between about 0.25 wt % and about 0.8 wt % of the total weight of the precursor of the insulative composition. In some embodiments, the cure package may include laccofine sulfur as the sulfur-based curing agent and NAUGEX® MBTS and TMTD as cure accelerators. For example, the precursor of the insulative composition may include about 1.31 wt % laccofine sulfur, about 0.65 wt % NAUGEX® MBTS and about 0.33 wt % TMTD.

The insulative composition may also, optionally, include at least one additive to achieve the desired properties in the insulative composition. As a non-limiting example, additives that may be used in the insulative composition may include an antioxidant, a tackifier, a processing aid, a plasticizer and an activator.

At least one antioxidant may be included in the precursor of the insulative composition to stabilize the NBR. For example, the precursor of the insulative composition may include an amine antioxidant, such as AGERITE® STALITE®, AGERITE® resin, AGERITE SUPERFLEX®, and combinations thereof. AGERITE® STALITE®, AGERITE® resin and AGERITE® SUPERFLEX® are commercially available from R.T. Vanderbilt Company, Inc. (Norwalk, Conn.). AGERITE® STALITE® may include a mixture of alkylated diphenylamines, such as a mixture of benzenamine, N-phenyl-, reaction products with styrene and 2,4,4-trimethylpentene, and diphenylamine. AGERITE® SUPERFLEX® may include diphenylamine-acetone reaction products, calcium silicate and diphenylamine. AGERITE® resin may include benzenamine, and N-phenyl-, reaction products with 2,4,4-trimethylpentene. The antioxidant may be included in the precursor of the insulative composition in an amount of between about 1 wt % and about 3.5 wt % of the total weight of the precursor of the insulative composition and, more particularly, between about 1.5 wt % and about 2.5 wt % of the total weight of the precursor of the insulative composition.

Tackifiers may include materials that develop a high tack level in the NBR, such as phenolic resins, polybutenes, hydrocarbons, and combinations thereof. For example, the tackifier may be a phenolic resin, such as AKROCHEM® P-133, AKROCHEM® P-104, AKROCHEM® P-172, AKROCHEM® P-183 and AKROCHEM® P-90, each of which is commercially available from Akrochem Corporation (Akron, Ohio), a hydrocarbon resin, such as WING-TACK® 95, which is commercially available from Cray Valley (Houston, Tex.), DUREZ® 31671, which is commercially available from Durez Corporation (Addison, Tex.) and DYPHENE® 8318 or DYPHENE® 8320 which are commercially available from Western Reserve Chemical (Stow, Ohio). AKROCHEM® P-133 is a thermoplastic, alkyl phenolic resin in a free-flowing flake form having a specific gravity of about 1.04, a melting point of about 97° C. and a Gardner-Holdt viscosity of about 0. The tackifier may be included in the precursor of the insulative composition in an amount of between about 4 wt % and about 12 wt % of the total weight of the precursor of the insulative composition and, more particularly, between about 6 wt % and about 10 wt % of the total weight of the precursor of the insulative composition.

By way of non-limiting example, processing aids may include a stearic acid, such as INDUSTRENE® B, which is commercially available from Crompton Corporation (Greenwich, Conn.), dicarboxylic and tricarboxylic ester-based compounds, naphthenic processing oils, and combinations thereof. The processing aid may be included in the precursor of the insulative composition in an amount of between about 0.1 wt % and about 2 wt % of the total weight of the precursor of the insulative composition and, more particularly, between about 0.5 wt % and about 1.5 wt % of the total weight of the precursor of the insualtive composition.

The insulative compound may additionally include a plasticizer, such as a dioctyl phthalate (DOP), a dioctyl adipate (DOA), a dioctyl terephthalate (DOTP), and combinations thereof. The plasticizer may be included in the precursor of the insulative composition in an amount of between about 4 wt % and about 12 wt % of the total weight of the precursor of the insulative composition and, more particularly, between about 6 wt % and about 10 wt % of the total weight of the precursor of the insulative composition.

Activators include, for example, metal oxides, such as zinc oxide (e.g., KADOX® 720C, which is commercially available from Horsehead Corp. (Monaca, Pa.)) and magnesium oxide (e.g., ELASTOMAG® 170, from Morton Chemical Co. (Chicago, Ill.)). The cure activator may be included in the precursor of the insulative composition in an amount of between about 1 wt % and about 5 wt % of the total weight of the precursor of the insulative composition and, more particularly, between about 2 wt % and about 3.5 wt % of the total weight of the precursor of the insulative composition.

Relative amounts of the NBR, the nanoclay, the cure package and the additives, if present, in the precursor of the insulative composition may be adjusted to achieve desired rheological, physical and mechanical properties, such as a desired specific gravity, compressive modulus, pre-cure viscosity, scorch properties, density, cure time, Shore A hardness, tensile strength or elongation at failure. The insulative composition of the present disclosure may have a substantially reduced specific gravity and compressive modulus in comparison to conventional NBR and SFNBR compositions and, thus, a thickness of the insulative composition of the present invention may be substantially reduced in ballistic applications. In addition, prior to curing, the precursor of the insulative composition may have a flowable consistency and an increased cure rate that provide improved fabrication efficiency.

The precursor of the insulative composition may be prepared by mixing the nanoclay with the NBR and one or more of the optional ingredients, if present, to form a master batch. During mixing, the master batch may reach a maximum temperature of between about 143° C. and about 154° C. and, more particularly about 148.89° C. (about 300° F.). The master batch may be mixed until the nanoclay and any optional ingredients are substantially evenly distributed in the NBR matrix. For instance, the master batch may be mixed for between about 5 minutes and about 25 minutes and, more particularly, about 12 minutes to promote exfoliation of the nanoclay by the NBR. Any remaining optional ingredients, if present, may be added and mixed into the master batch. The temperature of the master batch may be lowered before adding the cure package to prevent premature curing of the precursor insulative composition. For instance, during the curative mixing, the master batch may be exposed to a maximum temperature of between about 78° C. and about 100° C. and, more particularly about 87.78° C. (about 190° F.) before adding the cure package. About one-half (½) of a total volume of the master batch may initially be added to the cure package and mixed and, thereafter, the balance of the master batch (i.e., the remaining one-half (½) of the total volume of the master batch) may be mixed to form a precursor composition. The master batch and the cure package may be mixed until the precursor composition has a desired, flowable consistency. The insulative composition may be prepared in conventional rubber mixing equipment, such as in an internal mixer, a sigma blade mixer, a vertical blade mixer, or a compounding extruder mixer. Rubber mixing equipment is known in the art and, therefore, is not described in detail herein. The precursor composition may cure within between about one (1) minute and about ten (10) minutes to form the insulative composition. The precursor composition may be stored in the flowable state at temperature of about 0° C. for up to about one (1) year. The ability of the precursor to be easily molded and quickly cured enables increased production rates of articles including the insulative composition.

By forming the master batch including the NBR and the nanoclay and optional ingredients, if present, prior to adding the ingredients of the cure package, exfoliation and distribution of the nanoclay throughout the NBR is provided. Furthermore, mixing the nanoclay with the NBR and with fillers, such as the antioxidant and the processing aid, if present, before mixing with the other ingredients results in improved exfoliation and distribution of the nanoclay throughout the NBR.

The precursor of the insulative composition may be placed into a mold to form a desired shape, such as a sheet, and cured for use in an article, such as personnel body armor, ground vehicle armor and aircraft armor systems. In some embodiments, the sheet of the insulative composition may be used in a layered article including alternating layers of the insulative composition and a support material. For example, the support material may be a metal, plastic, a mesh or a fibrous material, such as DYNEEMA®, SPECTRA® fiber, TECHNORA®, VECTRAN®, polyester, nylon or propylene. FIG. 1 illustrates an example of an article 10 including layers of the insulative composition 12 disposed between layers of a support material 14. In the embodiment shown in FIG. 1, the insulative composition 12 is disposed between sheets of the support material 14 to form the article 10 that includes a plurality of layers. In other embodiments (not shown), a single layer of the insulative composition 12 may be disposed on the support material 14 as a reinforcement or barrier layer. The article 10 may be formed by curing the precursor of the insulative composition (not shown) into a mold or directly onto the support material 14 to form a sheet of the insulative composition 12. Since the low compressive modulus and low specific gravity of the insulative composition results in reduced weight, improved strength and improved shock absorption, a thickness of the insulative composition may be reduced while providing improved ballistic performance.

The following examples serve to explain embodiments of the present invention in more detail. These examples are not to be construed as being exhaustive or exclusive as to the scope of this invention.

EXAMPLES

Example 1

Formulation of Insulative Composition

A precursor of an insulative composition ("Precursor Composition") having the ingredients shown in Table 2 was formulated. The NIPOL® 1052 was mixed for about 1 minute. The CLOISITE® 10A, the AGERITE® STALITE®, and the INDUSTRENE® B were then added to the NIPOL® 1052 and mixed for about 12 minutes to form a mixture. The remaining ingredients (i.e., the AKROCHEM® P-133 resin, the KADOX® 720C and the dioctyl phthalate), except for the cure package, were then added to the mixture to form a master batch. The dioctyl phthalate was added slowly to the reaction mixture to prevent coagulation. During mixing, the temperature of the master batch was maintained at less than or equal to about 148.89° C. (300° F.). The ingredients of the master batch were mixed until the ingredients were substantially homogeneously dispersed in the NIPOL® 1052. The temperature of the master batch was reduced to a temperature of between about 21.11° C. (70° F.) and about 37.38° C. (100° F.) before about one-half (½) of the total volume of the master batch was added to the ingredients of the cure package (i.e., the laccofine sulfur, the NAUGEX® MBTS and the tetramethyl thiuram disulfide. The ingredients were mixed until they were substantially evenly distributed and then a balance of the master batch (i.e., the remaining one-half (½) of the total volume of the master batch) was added and mixed. The viscosity of the resulting precursor composition was sufficiently high to enable molding of the precursor composition into desired shape.

TABLE 2

| Precursor Composition | | |
|---|---|---|
| Material | Parts | wt % |
| NIPOL ® 1052 (NBR) | 100 | 62.25 |
| CLOISITE ® 10A (nanoclay) | 15 | 9.79 |
| AGERITE ® STALITE ® (amine antioxidant) | 3 | 1.96 |
| AKROCHEM ® P-133 RESIN (phenolic resin) | 12.75 | 8.32 |
| INDUSTRENE ® B (stearic acid) | 1.5 | 0.98 |
| Dioctyl Phthalate (DOP) | 12.5 | 8.16 |
| KADOX ® 720C (zinc oxide) | 5 | 3.26 |
| laccofine sulfur | 2 | 1.31 |
| NAUGEX ® MBTS (benzothiazyl disulfide) | 1 | 0.65 |
| tetramethyl thiuram disulfide (TMTD) | 0.5 | 0.33 |

Example 2

Rheological Properties of the Precursor Composition

The rheological properties of the Precursor Composition described in Example 1 were determined by conventional techniques. The results of the rheological testing are shown in Table 3. For comparative purposes, the rheological properties of a precursor of a conventional SFNBR composition, which is available from Kirkhill Elastomers (Brea, Calif.), are also provided. Mooney viscosity and Mooney Scorch of the precursor compositions were measured at 100° C., respectively, with a Mooney MV 2000 of Alpha Technologies (USA). Other rheological properties were determined using an Oscillating Disc Rheometer ODR-100S of Alpha Technologies (USA). For comparative purposes, available mechanical and physical properties of the conventional SFNBR composition are also shown.

TABLE 3

| Rheological Properties of the Precursor Composition and SFNBR | | |
|---|---|---|
| | Composition A | SFNBR |
| Mooney Viscosity at about 100° C. | 24.4 | |
| Mooney Scorch at about 121.1° C. | 13.6 | |
| Minimum torque (ML) | 4.16 | >11 |
| Maximum torque (MH) | 57.04 | >86 |
| Scorch time (TS2) | 2.92 min | >5 min |
| Optimum vulcanization time (T90) | 4.29 min | >12 min |

A comparison of the rheological properties of Composition A and the conventional SFNBR composition was made. The comparison showed that Composition A exhibited a substantially reduced minimum torque, maximum torque, scorch time, and optimum vulcanization time in comparison to the conventional SFNBR composition. The comparison showed that Composition A had superior rheological properties in comparison to the conventional SFNBR rubber.

The Precursor Composition exhibited a viscosity of about 24.4 and had a flowable consistency about twenty-four (24) hours after mixing. The viscosity of the Precursor Composition may be maintained by storing the Precursor Composition at a temperature of less than or equal to about 0° C. (32° F.).

Example 3

Mechanical and Physical Properties of the Insulative Composition

The Precursor Composition described in Example 1 was cured to form an insulative composition ("Composition A") and the mechanical and physical properties were determined. Table 4 shows the mechanical and physical properties of Composition A. These properties were determined by conventional techniques. For comparative purposes, the mechanical and physical properties of the SFNBR composition are also shown.

TABLE 4

Comparison of Mechanical and Physical Properties
of Composition A and an SFNBR Composition

|  | Composition A | SFNBR |
| --- | --- | --- |
| Specific gravity | 1.07 | 1.18-1.26 |
| Tensile strength | 900 | >1750 |
| Elongation at failure | 419 | >400 |
| Shore A Hardness | 57 | 60-80 |
| Compressive modulus | 507 psi | 1210 psi |

Composition A was tested for physical properties (specific gravity) and mechanical properties (tensile strength, elongation at failure, Shore A hardness and compressive modulus). A comparison of the physical properties and mechanical properties of Composition A and the conventional SFNBR composition was made. The comparison showed that Composition A had a substantially reduced specific gravity and, thus, exhibited a weight of about 14% less than the conventional SFNBR composition. The comparison showed that Composition A had superior strength and compressive modulus in comparison to the conventional SFNBR rubber.

The invention has been described herein in language more or less specific as to composition structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An article, comprising:
   at least one layer of a support; and
   an uncured fiber-free composition in contact with the at least one layer of the support, the uncured fiber-free composition comprising:
   at least one nitrile butadiene rubber comprising between about 50% by weight and about 80% by weight of a total weight of the uncured fiber-free composition;
   a nanoclay homogeneously dispersed within the uncured fiber-free composition; and
   a sulfur-based curing agent,
   wherein the uncured fiber-free composition comprises an isotropic material.

2. The article of claim 1, wherein the at least one nitrile butadiene rubber comprises between about 60% by weight and about 70% by weight of the total weight of the uncured fiber-free composition.

3. The article of claim 1, wherein the nanoclay comprises a montmorillonite clay.

4. The article of claim 1, wherein the uncured fiber-free composition further comprises a cure accelerator.

5. The article of claim 4, wherein the cure accelerator comprises at least one material selected from the group consisting of tetramethyl thiuram disulfide and benzothiazyl disulfide.

6. The article of claim 1, wherein the nanoclay comprises between about 8% by weight and about 12% by weight of the total weight of the uncured fiber-free composition.

7. The article of claim 1, wherein the uncured fiber-free composition further comprises at least one of an antioxidant, a tackifier, a processing aid, a plasticizer, and an activator.

8. The article of claim 1, wherein the uncured fiber-free composition further comprises at least one of an amine antioxidant, a phenolic resin, stearic acid, dioctyl phthalate, and zinc oxide.

9. The article of claim 1, wherein the nanoclay comprises magnesium aluminum silicate platelets modified with a quaternary ammonium salt.

10. The article of claim 1, wherein the at least one layer of a support comprises at least two layers of the support separated by the uncured fiber-free composition.

11. The article of claim 1, wherein the uncured fiber-free composition comprises a first portion and a second portion, wherein the first portion is disposed on a first side of the at least one layer of the support, and wherein the second portion is disposed on a second opposite side of the at least one layer of the support.

12. An armor material, comprising:
    layers of a support material; and
    a fiber-free composition between adjacent layers of the support material, the fiber-free composition comprising:
    at least one nitrile butadiene rubber comprising between about 50% by weight and about 80% by weight of a total weight of the fiber-free composition;
    a nanoclay homogeneously dispersed within the fiber-free composition; and
    a sulfur-based curative,
    wherein the fiber-free composition comprises an isotropic material.

13. The armor material of claim 12, wherein the fiber-free composition further comprises at least one of tetramethyl thiuram disulfide and benzothiazyl disulfide.

14. The armor material of claim 12, wherein the support material comprises a fibrous material.

15. A method of forming an armor material, comprising:
    exfoliating a nanoclay with a polymer comprising at least one nitrile butadiene rubber to form a homogeneous mixture of the nanoclay and the polymer;
    combining the homogeneous mixture with a sulfur-based curative to form a fiber-free composition; composition;
    disposing the fiber-free composition adjacent layers of a support material; and
    curing the fiber-free composition to form a cured fiber-free composition comprising the at least one nitrile butadiene rubber, the nanoclay homogeneously dispersed within the cured fiber-free composition, and the sulfur-based curative, wherein the fiber-free composition comprises an isotropic material, and wherein the at least one nitrile butadiene rubber comprises between about 50% by weight and about 80% by weight of a total weight of the cured fiber-free composition.

16. The method of claim 15, wherein exfoliating a nanoclay with a polymer comprising at least one nitrile butadiene rubber to form a homogeneous mixture of the nanoclay and the polymer comprises mixing the at least one nitrile butadiene rubber with the nanoclay for a time period between about 5 minutes and about 25 minutes to form the homogeneous mixture.

17. The method of claim 15, wherein exfoliating a nanoclay with a polymer comprising at least one nitrile butadiene rubber to form a homogeneous mixture of the nanoclay and the polymer further comprises mixing an amine antioxidant and a phenolic resin with the homogeneous mixture.

18. The method of claim 15, wherein combining the homogeneous mixture with a sulfur-based curative to form a fiber-free composition comprises mixing a first portion of the homogeneous mixture with the curative to form a premix and mixing a second remaining portion of the homogeneous mixture with the premix to form the fiber-free composition.

19. The method of claim 18, wherein mixing a first portion of the homogeneous mixture with the curative to form a premix comprises mixing about one-half of a total volume of the homogeneous mixture with the curative to form the premix.

20. The method of claim 15, wherein combining the homogeneous mixture with a sulfur-based curative to form a fiber-free composition comprises mixing the homogeneous mixture with laccofine sulfur and at least one of tetramethyl thiuram disulfide and benzothiazyl disulfide to form the fiber-free composition.

21. The method of claim 15, further comprising adding at least one material selected from the group consisting of a tackifier, an activator, and a plasticizer to the homogeneous mixture before combining the homogeneous mixture with the curative.

22. The method of claim 15, wherein combining the homogeneous mixture with a sulfur-based curative to form a fiber-free composition comprises forming a fiber-free composition having a Mooney viscosity of less than about 30 at a temperature of 100° C.

* * * * *

UNITED STATES PATENT AND TRADEMARK OFFICE
CERTIFICATE OF CORRECTION

PATENT NO. : 9,850,353 B2  
APPLICATION NO. : 14/599395  
DATED : December 26, 2017  
INVENTOR(S) : Himansu M. Gajiwala and John W. Ellertson Page 1 of 1

It is certified that error appears in the above-identified patent and that said Letters Patent is hereby corrected as shown below:

In the Specification  
    Column 7,     Line 30,     change "of the insualtive" to --of the insulative--

In the Claims  
Claim 15,     Column 12,     Line 40,     change "fiber-free composition; composition;" to --fiber-free composition;--

Signed and Sealed this  
Twenty-third Day of January, 2018

Joseph Matal  
*Performing the Functions and Duties of the*  
*Under Secretary of Commerce for Intellectual Property and*  
*Director of the United States Patent and Trademark Office*